Jan. 27, 1970  S. PEZARRO ET AL  3,492,249
ANISOTROPIC FOAMS OF POLY(2,6-DIMETHYLPHENYLENE OXIDE)
Filed Oct. 11, 1965
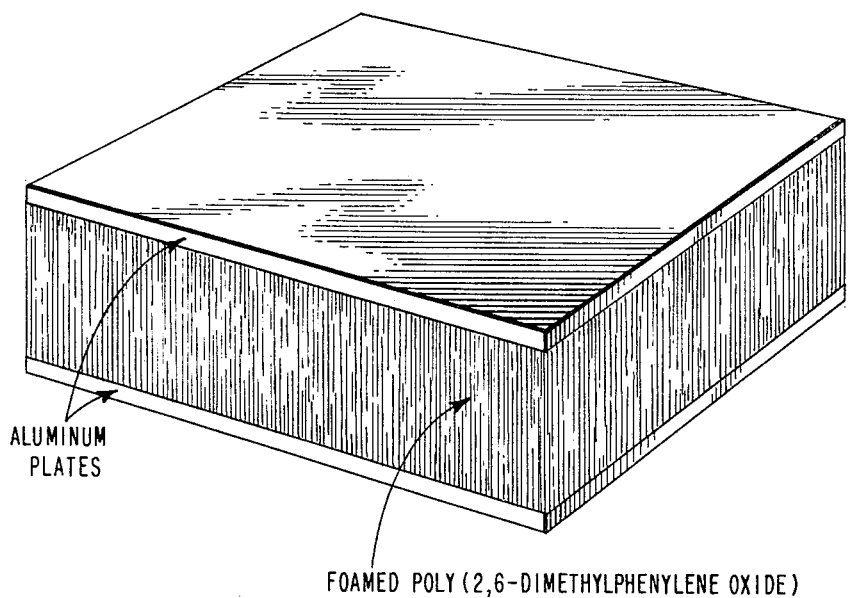
ALUMINUM PLATES
FOAMED POLY(2,6-DIMETHYLPHENYLENE OXIDE)
INVENTORS
Salomon Pezarro,
Boudewijn Leendert Boogaard
BY Stevens, Davis, Miller & Mosher
ATTORNEYS United States Patent Office 3,492,249
Patented Jan. 27, 1970

3,492,249
ANISOTROPIC FOAMS OF POLY(2,6-DIMETHYL-PHENYLENE OXIDE)
Salomon Pezarro, Pijnakker, and Boudewijn L. Boogaard, Delft, Netherlands, assignors to Algemene Kunstzijde Unie, N.V., Arnhem, Netherlands, a corporation of the Netherlands
Filed Oct. 11, 1965, Ser. No. 494,782
Claims priority, application Netherlands, Oct. 31, 1964, 6412700
Int. Cl. C08g 53/10, 23/16
U.S. Cl. 260—2.5
3 Claims

ABSTRACT OF THE DISCLOSURE

Novel foams of poly(2,6 - dimethylphenylene oxide) having a highly anisotropic structure, with elongated cells at least five times as long as their largest width, are prepared by incorporating a suitable blowing agent in poly(2,6-dimethylphenylene oxide) and then heating to a temperature at which the blowing agent becomes active.

---

The invention relates to a method for the preparation of a foam from a polymer by incorporating a blowing agent in the polymer which is subsequently heated to a temperature at which the blowing agent becomes active.

A method of this general type is known and is used, inter alia, in the manufacture of polystyrene foam.

In addition to polystyrene foam many other foams of polymers are known, which foams may be prepared by the above-indicated method or by other methods. Examples of the known foams are foams of natural or synthetic rubber, of phenolformaldehyde resin, of polyvinyl chloride, of cellulose esters, and of polyurethanes.

The choice of the foam will depend on the application contemplated for the foam.

In making such choice the properties which may play a deciding role may, inter alia, be the density of the foam, the degree of rigidity or resilience, the maximum temperature at which the foam retains its properties, the degree of flammability, the thermal conductivity, the mechanical properties such as the compressibility and strength, the water-absorption capacity, the sound-absorption capacity, the liquid and gas permeability, the uniformity of the cell structure, the resistance to aging and to chemical attack, the electrical properties, the price, etc.

In considering the properties of the known foams there will be for a great many applications no difficulty in choosing a foam which is satisfactory in all respects.

There are other applications, however, for which the foam is required to satisfy such a combination of demands as can hardly or not at all be met by the known foams.

A great disadvantage to the known foams of thermoplastic polymers such as polystyrene and polyvinyl chloride is that they are not resistant to temperatures higher than about 70° C. Although these known foams are particularly suitable heat-insulating materials at relatively low temperatures, they cannot be used for insulating purposes at temperatures higher than 70° C.

Another disadvantage to the widely used polystyrene foam is its low strength.

The present invention has for its object to provide a polymer foam which has a number of extraordinary properties, so that for many applications it has great advantages over the known foams. In contrast to other foams of thermoplastic polymers, a foam according to the present invention has, for instance, a high resistance to heat, which makes it very suitable for use, for instance, as heat-insulating material at high temperatures.

The afore-mentioned advantages and other particularly favorable properties of the foams according to the present invention will be further described hereinafter.

The process according to the present invention for the prepartion of a foam from a polymer by incorporating a blowing agent in the polymer which is subsequently heated to a temperature (for instance in the range 125° to 200° C.) at which the blowing agent becomes active is characterized in that as a polymer use is made of poly-(2,6-dimethylphenylene oxide). When the term poly(2,6-dimethylphenylene oxide) is used hereinafter, it is intended to mean poly(2,6-dimethylparaphenylene oxide) of the formula

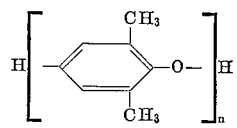

in which $n$ is at least 100.

Poly(2,6-dimethylphenylene oxide) is a per se known polymer, which may be obtained, inter alia, by the oxidative polymerization of 2,6-xylenol, as is described in the British Patent No. 930,993. The molecular weight of the polymers which are suitable for the foam according to the present invention may vary between wide limits.

Foams obtained from poly(2,6-dimethylphenylene oxide) having a relative viscosity of at least 1.30 (measured on a solution of 1 part by weight of polymer in 100 ml. benzene) have the most favorable properties and are therefore to be regarded as preferred.

The foam according to the present invention is a resistant to prolonged heating at high temperatures and may therefore be used, inter alia, as insulating material for conduits and vessels. Depending on the compounds added to the foam, it may be used at temperatures up to about 200° C.

Although in general the foams according to the present invention may be prepared by the usual methods for the manufacture of foams from thermoplastic polymers, it is preferred to employ a method in which as a blowing agent use is made of a solvent or a swelling agent for the polymer. Suitable blowing agents of this type are, for instance, alkanes having from 5 to 7 carbon atoms, cyclohexane, halogenated hydrocarbons such as trichlorofluromethane, 1,1,2-trichloro-1,2,2-trifluroethane, 1,2-dichloroethane, alcohols, ethers, ketones, aldehydes, tetramethylsilane, etc. Also mixtures of these compounds may be used. A mixture of a solvent and a non-solvent (swelling agent) gives particularly favorable results.

The amount in which the physical blowing agent is used may vary between wide limits. In general, the best results are obtained when using an amount of 15 to 45 parts by weight per 100 parts by weight of polymer.

Since for a great many applications it is very desirable to use a fine-celled foam, it is preferred to incorporate in the polymer a nucleating agent in addition to the blowing agent.

If as a blowing agent use is made of a solvent or a swelling agent, then it is preferred to use as a nucleating agent a chemical blowing agent. In that case the chemical blowing agent is used in a small amount (e.g., 0.5 to 10 parts by weight per 100 parts by weight of polymer) which would in itself be insufficient to cause the polymer to foam in the absence of a physical blowing agent.

Examples of chemical blowing agents that may serve as nucleating agents are N-nitroso-beta-aminoketones, azodicarbonamide, substituted diazoacetic acid esters, azodinitroisobutyric acid, and mixtures of these compounds.

If a plasticizer is present, it is also possible to make foams without using a physical blowing agent, i.e. exclusively with the aid of a chemical blowing agent.

Another group of nucleating agents which give very favorable results are finely divided inorganic compounds, of which particularly the silicates are to be preferred. Of the silicates vermiculite is to be preferred, since it is a very effective and inexpensive nucleating agent.

Also mixtures of a chemical blowing agent and a finely divided inorganic compound may be used as nucleating agent in combination with a physical blowing agent.

It is also possible to use the method described in Chemical Week for Sept. 26, 1964 at page 57, which comprises the use as nucleating agents of finely divided molten metal or freshly prepared metal particles or carbon particles, use being made of gases under pressure as blowing agents.

A particularly preferred method of carrying out the process according to the present invention consists in that the mixture of the polymer and the blowing agent is heated to a temperature at which the blowing agent has a vapor pressure which is at atmospheric pressure sufficiently high to cause the polymer to be foamed, the heating being carried out while the mixture is kept under a pressure at which there is yet on cell formation, the pressure being abruptly released as soon as all of the mixture has reached said temperature.

By this procedure, which has not resulted in satisfactory foams in the case of the thermoplastic polymers processed so far, it is possible according to the present invention to obtain particularly valuable foams.

Foams thus manufactured are different from the known thermoplastic foams in that they have a highly anisotropic structure.

It is true that known foams may upon extrusion become slightly anisotropic, as a result of which the strength in the longitudinal direction of the foam may be, for instance, up to 30% higher than in a direction perpendicular thereto. Although the cells of these known slightly anisotropic foams may be somewhat flattened, they do not deviate from the spherical shape as strongly as the cells of the highly anisotropic foams according to the present invention.

Anisotropic foams according to the present invention which are to be preferred because of their special properties have cells the majority of which are elongated and the length of which is at least five times the largest width.

By preference, the preparation of highly anisotropic foams according to the present invention is so carried out that the mixture of polymer and blowing agent is introduced between two parallel plates which cannot move relative to each other during heating of the mixture, but which, after the mixture has reached the desired temperature, may move apart parallel to each other.

In this way a foam slab is obtained in which the elongated cells are directed parallel to foam rise. Such a slab has a very high resistance to compression in a direction parallel to foam rise. Perpendicular to foam rise, however, such a slab is easily compressible.

In the manufacture of such foam slabs the mixture of the polymer and the blowing agent is preferably introduced between the parallel plates in sheet form, because the filling of the apparatus in which the foam slabs are made may then be done very rapidly and the amount of the mixture per unit surface area is the same at any point between the two plates.

The mixture of polymer and blowing agent may be formed into a sheet in a simple manner by rolling on a roller pair the polymer while in a finely divided state, e.g. in the form powder or granules, together with a solvent or a swelling agent for the polymer. In order that the polymer may be homogeneously mixed with the blowing agent, the sheet thus obtained may be left for some time before it is processed.

When the foam is being formed, the polymer strongly adheres to many kinds of surfaces, so that it is advisable to provide between the mixture and the parallel plates a layer of a substance which prevents the polymer from adhering to said plates. To this end use may be made, for instance, of aluminum foil which may, if desired, later on be removed from the finished foam slab. Thin adhesion strongly promotes the formation of an anisotropic foam.

The slab-shaped anisotropic foam offers considerable advantage when applied in the making of sandwich structures, in which case the foam slab is placed between two sheets or skins of a more or less rigid material. The skins of the sandwich structures may, for instance, be of plywood, aluminum or of a plastic material that may or may not be reinforced with fibers.

As mentioned before, while the foam is being formed the polymer strongly adheres to many kinds of surfaces. In the manufacture of sandwich structures this property may be taken advantage of. Between the parallel plates and the mixture to be foamed a layer of rigid material is placed to which the polymer adheres, in which case it is possible in one process step to obtain a sandwich structure in which the intermediate layer is formed by the anisotropic foam according to the present invention.

Such a sandwich structure has a high resistance to compression and bending and offers great advantages for materials of construction.

By having the facings consist of aluminum sheet, the material may find application in the aircraft industry, for instance, to replace the conventional sandwich structures of balsa wood, which has the disadvantage that it is not entirely homogeneous and is very costly. This construction is shown in the accompanying drawing.

By having the facings consist of sheets of a laminate of a melamine-formaldehyde resin, which may moreover be provided with a decorative surface layer, a light but very strong and dimensionally stable material of construction is obtained which is useful in the cabinet-making and building industries.

Although the compressive strength of the above-described sandwich structures is high, it may be further increased by placing more than one sheet of the mixture of polymer and blowing agent between the parallel plates. In this way a plurality of layers of elongated cells are obtained, which are separated by a closed layer which contributes to the compressive strength of the structure in that it reduces the length, and thus the chance of buckling, of the elongated cells.

The sandwich structures may be strengthened ever further by using a plurality of sheets between which there is introduced a layer of rigid material to which the polymer adheres during foaming. To this end it is preferred to use a sheet of aluminum.

The above-described foam slabs with elongated cells may be used not only in sandwich structures but also in various other applications.

Depending on the conditions chosen for the preparation, for instance: the nature of the blowing agents, the presence or absence of nucleating agents, the foaming temperature, the presence or absence of a non-volatile plasticizer, widely varying types of foam may be obtained.

If no use is made of a nucleating agent, the foam obtained generally shows elongated cells having a width in the order of magnitude of one or a few millimeters. The lengths of the cells may be equal to the thickness of the foam slabs.

This slab foam may serve as decorative material, in which case also advantage may be taken of its favorable sound absorption properties. It may further be used as decorative transparent material in lighting panels and lamp shades. Furthermore, it may be applied for packaging purposes just as with the known foams. For the same purposes, use may also be made of foams having a fine to very fine cell structure.

The slab foam may also be used for filtering purposes. Use is then made of a slab foam the cells of which have a length which is as great as the thickness of the slab. These cells are opened by removing the surface layer on either side of the slab, e.g. by sawing or cutting. In this way a slab is obtained with a very large number of channels perpendicular to the faces of the slab. These channels will allow the passage therethrough of a liquid or gas, the solid particles being arrested. This application is of importance to the chemical industry and in the purification of air in air treating plants because of the electrostatic charge of the material it attracts dust. The foam may also be used in the manufacture of cigarette filters.

Such slab foam may be made very useful by chemically so modifying the material that it is given ion-exchanging properties. An ion-exchanger is then obtained in a form which is particularly suitable for the treatment of liquids. Converting the foam into a foam having ion-exchanging properties may be effected by any suitable method, e.g. by treating it with chlorosulphonic acid, by nitration with nitric acid followed by reduction of the introduced nitro groups to amino groups, or by some other method, as is described, for instance, in Canadian Patent No. 711,314.

Alternatively, the polymer may before foaming be mixed with an ion-exchanger material in the form of a powder, as a result of which a foam is also obtained having ion-exchanger properties.

Thin foams according to the present invention may be used in the clothing industry, in which for some applications (e.g., padding material) the anisotropy may be of considerable importance.

The foams according to the present invention have favorable electrical properties, low thermal conductivity, are resistant to temperatures up to 200° C., are resistant to aging and, depending on the method of preparation, may have widely varying densities. They generally have a satisfactory mechanical strength and are resistant to attack by moisture.

Compared with foams of thermo-hardening plastics, the foams according to the present invention are more resilient and, hence, have a higher impact strength.

It is, of course, possible to vary the properties of the foams according to the present invention by adding to the mixture to be foamed substances which affect the properties of the foam in a desired manner, such as fillers, pigments, stabilizers, flame retardants such as antimony oxide, dyes, fibers, plasticizers, etc.

As foams are voluminous so that transport in large quantities is costly, it is sometimes advisable to carry out the foaming in situ where the foam is to be actually applied. If the foam is used in the form of slabs, use may be made then of an expandable sheet of a mixture of poly (2,6-dimethylphenylene oxide) and a blowing agent, which sheet is placed between two layers of, e.g., aluminum foil. Such material can easily be transported and may be processed into a foam slab in situ, where a press must be available in which the material may be foamed. This may be a press with two heated parallel plates, or use may be made of a pair of heated rollers between which the sheet is passed.

The preparation of mixtures of the polymer and the blowing agent may be carried out in many ways, e.g. by kneading the polymer together with the blowing agent on a pair of rollers.

It is also possible to slurry finely divided polymer in water and to add to the slurry a solvent or a swelling agent for the polymer. The polymer then absorbs the substance added and, after the solid matter has been separated from the aqueous medium, a foamable product is obtained.

A further variation consists in that a sheet of the polymer is left in contact with a physical blowing agent alone or in admixture with another liquid.

Since poly(2,6-dimethylphenylene oxide) is generally prepared in such manner that it is obtained in the form of a solution in, e.g. toluene, it is possible to prepare a foamable product immediately after the polymer has been obtained. From the reaction mixture first the undersirable substances such as catalyst residues are removed, and then a precipitant is added to the polymer solution. The polymer thus precipitated is separated off. It then still contains considerable amounts of solvent. The solvent is removed to such an extent that a sufficient amount thereof is left in the polymer to serve as blowing agent. If desired, however, another physical or chemical blowing agent or a nucleating agent may be added to the mixture.

If use is made of physical blowing agents, these may be added to the polymer in an extruder, or the blowing agent may be brought into contact with the polymer, if desired at elevated temperature and/or pressure, the polymer absorbing the blowing agent.

The foams according to the present invention may be prepared from poly(2,6-dimethylphenylene oxide) only, or, of course, from said polymer in combination with some other polymer, such as polystyrene, polycarbonate, polyvinylchloride, polyolefines such as polyethylene, polyamides such as nylon 6, or unsaturated compounds which after foaming may be cross-linked. The amount in which the said other polymer may be added is dependent on the nature of said polymer and may, for instance, be in the range of from 0.1% by weight to 50% or more by weight.

The invention will be further elucidated by means of the following examples, to which the invention is, of course, not limited. The relative viscosity is in all cases measured on a solution of 1 g. of the polymer in 100 ml. benzene at 20° C.

EXAMPLE I

A number of portions of powdered poly(2,6-dimethylphenylene oxide) having a relative viscosity of 1.85 are kept for some time in contact with a swelling agent at a given temperature and pressure. It is found that after some time the polymer has absorbed part of the swelling agent. The polymer granules are then exposed to the air, upon which part of the swelling agent absorbed evaporates until an equilibrium is reached, after which hardly any more swelling agent is given off. With all the samples this equilibrium content is reached after 100 hours.

The granules are then heated by immersing them in hot glycerol, upon which foaming takes place. The results with various swelling agents are shown in the following Table I.

TABLE I

| Run | Swelling Agent, Type | Introduced at ° C. | Equilibrium Content in ml. per 100 g. polymer | Foaming temperature ° C. | Evaluation of the foam |
|---|---|---|---|---|---|
| A | Hexane | 150 | 24 | 180 | Fine-celled foam, density about 100 kg./m.$^3$ |
| B | Heptane | 150 | 20 | 180 | Fine-celled foam with hard skin. |
| C | Petroleum ether (boiling point 60–80° C.). | 150 | 28 | 200 | Well-foamed granules, density about 40 kg./m.$^3$ |
| D | do | 150 | 23 | 200 | Well-foamed granules, density about 60 kg./m.$^3$ |
| E | 1,1,2-trichloro-1,2,2-trifluoroethane. | 170 | 33 | 180 | Very fine celled foam. |

EXAMPLE II

A number of portions of poly(2,6-dimethylphenylene oxide) having a relative viscosity of 1.85 are each mixed on a pair of cold rollers with solvent in an amount which is approximately equal to the amount of polymer until there is left 40 g. solvent per 100 g. polymer. Then the mass is rolled into sheets about 1 mm. thick, which are exposed to the air for 100 hours at room temperature, after which only very little solvent is given off.

The sheets are then foamed by heating them in glycerol or air. The results obtained are shown in the following Table II.

TABLE II

| | Solvent | | Foaming | |
| --- | --- | --- | --- | --- |
| Run | Type | Equilibrium content in ml. per 100 g. polymer | Medium | Temp., °C. | Foam Rise |
| F1 | Chloroform | 28 | Glycerol | 150 | x25 |
| F2 | do | 28 | do | 190 | x30 |
| F3 | do | 28 | Air | 190 | x20 |
| G1 | Benzene | 45 | Glycerol | 150 | x30 |
| G2 | do | 45 | do | 190 | x50 |
| G3 | do | 45 | Air | 190 | x30 |
| H1 | Trichloroethylene | 28 | Glycerol | 150 | x25 |
| H2 | do | 28 | do | 190 | x50 |
| H3 | do | 28 | Air | 190 | x20 |
| I | Toluene | 46 | Glycerol | 190 | x55 |
| J1 | Carbon tetrachloride | 38 | do | 150 | x45 |
| J2 | do | 38 | do | 190 | x75 |
| J3 | do | 38 | Air | 190 | x35 |
| K | Xylene | 45 | Glycerol | 190 | x22 |
| L | 1,2-dichloroethane | 31 | do | 190 | x25 |

EXAMPLE III

On a pair of cold rollers 100 parts by weight of powdered poly(2,6-dimethylphenylene oxide) are kneaded with 80 parts by weight of 1,2-dichloroethane at room temperature until a homogeneous mixture is obtained which contains 40 parts by weight of 1,2-dichloroethane per 100 parts by weight of polymer. On the rollers the mixture is formed into a sheet 1.5 mm. thick. The sheet is introduced between two aluminum plates 1 mm. thick. These plates with the sheet positioned between them are placed between the plates heated at 180° C. of a press in which a pressure of 7 kg./cm.$^2$ is maintained for 20 seconds. After that the top plate of the press is rapidly raised and the sheet rises to a foam about 25 mm. thick. In this way a sandwich structure is obtained in which the foam is intimately connected with the plates. The average diameter of the elongated cells of this foam is about 1 mm. The accompanying figure illustrates the material obtained in this way.

In another similar run, the top plate, after heating, is allowed to rise only 20 mm., which results in the formation of a structure about 20 mm. thick, the foam of which has a density which is about 20% higher than that of the sandwich structure obtained in the first run.

EXAMPLE IV

In the same manner as described above in Example III another sandwich structure is made having a thickness of about 25 mm., except that in this case 3 parts by weight of azodicarbonamide are added to the mixture to be foamed.

In this case the average diameter of the elongated cells is about 0.1 mm.

EXAMPLE V

In the same manner as described above in Example IV another sandwich structure is made, except that between the aluminum plates two polymer sheets are laid one on top of the other, each sheet having a thickness of 0.75 mm. In this case the material is heated for 30 seconds.

The resulting sandwich structure is different from that obtained in Example IV in that the foam consists of two layers of parallel cells separated by a thin polymer layer which is positioned halfway between the two aluminum plates.

EXAMPLE VI

Foam obtained in the manner described above in Example 1A is kneaded with 1,2-dichloroethane on a pair of rollers in the manner described above in Example III until a homogeneous mass is obtained which is rolled to a sheet 1.5 mm. thick.

The sheet is laid between two sheets of aluminum foil with which it is introduced between two plates heated at 180° C. and kept at a pressure of 7 kg./cm.$^2$. After 20 seconds the pressure is released, upon which the material rises to a foam slab 25 mm. thick. The aluminum foil is pulled off the foam slab. The foam slab is compressible in a direction perpendicular to foam rise, but is highly resistant to deformation in a direction parallel to foam rise. This run shows that previously foamed material can be used again as starting material.

The foam obtained is heated in the air for 72 hours at 180° C. After this treatment there are hardly any signs of shrinkage or change in the mechanical properties of the foam.

EXAMPLE VII 100 parts by weight of poly(2,6-dimethylphenylene oxide) having a relative viscosity of 1.85 are kneaded with 60 parts by weight of 1,2-di-chloroethane on a pair of cold rollers until a given percentage of 1,2-di-chloroethane is still present in the polymer. The mixture is rolled into sheets 1.5 mm. thick. The sheets obtained are left for 10 minutes, after which they are placed between two heated parallel plates, where they are kept for 15 seconds at a pressure of 70 kg./m.$^2$. Then the pressure is released and foaming takes place.

The conditions and the properties of the foams obtained are shown in the following Table III.

TABLE III

| Parts by weight of solvent per 100 parts by weight of polymer | Temp. plates, °C. | Foam thickness, mm. | Average cell width, mm. | Foam density, kg./m.$^3$ |
| --- | --- | --- | --- | --- |
| 40 | 170 | About 35 | 2–3 | 23 |
| 40 | 154 | About 30 | 3–4.5 | 20 |
| 40 | 180 | About 30 | 1–1.5 | 19 |
| 30 | 170 | About 35 | 1–1.5 | 24 |

The foams thus obtained have elongated cells the length of which is about equal to the thickness of the foam layer. The cells form a honeycomb structure.

In spite of the very low density, the foam offers considerable resistance to compression in the longitudinal direction of the cells.

EXAMPLE VIII 100 parts by weight of powdered poly(2,6-dimethylphenylene oxide) are kneaded with 60 parts by weight of 1,2-dichloroethane and 5 parts by weight of vermiculite on a pair of rollers until a homogeneous mass is obtained which still contains 40 parts by weight of 1,2-dichloroethane. This mass is formed into a sheet 1 mm. thick. The sheet is chopped into pieces having dimensions of about 1 mm. The pieces are scattered onto a flat plate in a layer about 3 mm. thick. A second plate having a temperature of 190° C. is kept on the pieces for 30 seconds at a pressure of 9 kg./cm.$^2$. After that the plate is rapidly raised, the material rising to a foam 30 mm. thick having elongated cells the longitudinal direction of which is parallel to the foam rise. The average width of the cells is 0.1 mm.

EXAMPLE IX 100 parts by weight of poly(2,6-dimethylphenylene oxide) having a relative viscosity of 1.3 are homogeneously mixed with 40 parts by weight of 1,2-dichloroethane and made into a sheet 1.5 mm. thick. In the manner of Example III the sheet is formed to a foam slab 15 mm. thick. The cells in this foam are elongated.

EXAMPLE X 100 parts by weight of poly(2,6-dimethylphenylene oxide) having a relative viscosity of 2.40 are thoroughly mixed with 4 parts by weight of dichloroethane and 10 parts by weight of azodicarbonamide and formed to a sheet 1.5 mm. thick.

After foaming in the manner of Example III a slab of fine-celled foam is obtained which is more resilient than the foam obtained in the manner of Example III, and the cells are less elongated than the cells of the foam of Example III.

EXAMPLE XI

A foam slab is made in the same manner as described in Example III, except that between the sheet to be foamed and the parallel plates of the press aluminum foil is provided. The space between the two parallel plates of the press is bounded on its sides in that the plates are in the form of a mould having a circular section. After the sheet has been foamed in the manner described in Example III, a round foam slab about 25 mm. thick is obtained having a fine structure of elongated cells the majority of which have a length which is at least five times their largest width. The cells are directed parallel to foam rise and are distributed very uniformly over the slab.

EXAMPLE XII

On a pair of cold rollers 50 parts by weight of poly(2,6-dimethylphenylene oxide) and 50 parts by weight of polystyrene are kneaded with 80 parts by weight of 1,2-dichloroethane and 5 parts by weight of vermiculite at room temperature until a homogeneous mass is obtained which still contains 40 parts by weight of 1,2-dichloroethane. The mass is formed to a sheet 1 mm. thick. This sheet is laid between two sheets of aluminum foil with which it is introduced between two parallel plates heated at 150° C. and kept for 12 seconds at a pressure of 6 kg./cm.$^2$, after which the plates are rapidly moved apart.

In this way a foam slab 25 mm. thick is obtained. The cells of the foam have an elongated structure. The foam is somewhat less strong and more brittle than the foam made in the same manner from poly(2,6-dimethylphenylene oxide) unmixed with polystyrene.

EXAMPLE XIII 50 parts by weight of polyvinyl chloride and 50 parts by weight of poly(2,6-dimethylphenylene oxide) are foamed in the manner described in Example XII, except that the temperature of the plates is 180° C. and the heating time is 10 seconds. In this way a high-grade foam is obtained which, however, adheres less satisfactorily to aluminum than does foam made from pure 2,6-dimethylphenylene oxide. It differs from foam made from pure polyvinyl chloride mainly in that it is characterized by a structure of elongated cells.

EXAMPLE XIV 50 parts by weight of poly(2,4-dimethylphenylene oxide) and 50 parts by weight of polycarbonate (prepared from bisphenol A and phosgene) are made to a foam in the manner described in Example XIII. The foam obtained has elongated cells, which are distributed somewhat non-uniformly. It differs from foam made from pure polycarbonate mainly in that it is characterized by a structure of elongated cells.

EXAMPLE XV 100 parts by weight of powdered poly(2,6-dimethylphenylene oxide) are dispersed in 1500 parts by weight of water to which have been added 65 parts by weight of 1,2-dichloroethane, which is rapidly absorbed by the polymer. The polymer is filtered off and contains the solvent. The mixture of polymer and solvent thus obtained may be foamed in the normal manner. By starting from polymer granules instead of from powder the same results are obtained.

EXAMPLE XVI 100 parts by weight of poly(2,6-dimethylphenylene oxide) (relative viscosity 1.80) are thoroughly mixed with 50 parts by weight of dioctyl phthalate and 10 parts by weight of azodicarbonamide.

This mixture, which contains only chemical and no physical blowing agents, may be made in a heated mold into an excellent foam the cells of which have an elongated structure.

While specific examples of preferred methods and products embodying the present invention have been descirbed above, it will be apparent that many changes and modifications may be made in the details regarding the methods of procedure and the products without departing from the true spirit of the invention. It will therefore be understood that the particular methods and products set forth above are intended to be illustrative only, and are not intended to limit the scope of the invention which is defined by the following claims.

What is claimed is:

1. Anisotropic foam of poly(2,6-dimethylphenylene-1,4 oxide) having elongated cells, the length of which is at least five times their largest width.

2. Foam according to claim 1, the polymer of which has a relative viscosity of at least 1.30 measured on a solution of 1 g. polymer in 100 ml. benzene.

3. Foam according to claim 1 made from a mixture of poly(2,6-dimethylphenylene-1,4 oxide) with polystyrene.

References Cited

UNITED STATES PATENTS

| 3,383,435 | 5/1968 | Cizek | 260—874 |
| 2,769,205 | 11/1956 | Pfleumer | 260—724 |
| 3,259,592 | 7/1966 | Fox et al. | |
| 3,262,988 | 7/1966 | Joyce | 260—2.5 |
| 3,306,874 | 2/1967 | Hay. | |

MURRAY TILLMAN, Primary Examiner

W. J. BRIGGS, Sr., Assistant Examiner

U.S. Cl. X.R.

260—47